C. ADAMS.
Felly-Joint Holder.

No. 208,218. Patented Sept. 24, 1878.

Witnesses:
W. T. Morsell
R. K. Evans

Inventor.
Clinton Adams
by A. H. Evans & Co
Atty's

UNITED STATES PATENT OFFICE.

CLINTON ADAMS, OF WASHINGTON, DISTRICT OF COLUMBIA.

IMPROVEMENT IN FELLY-JOINT HOLDERS.

Specification forming part of Letters Patent No. 208,218, dated September 24, 1878; application filed September 5, 1878.

*To all whom it may concern:*

Be it known that I, CLINTON ADAMS, of Washington, District of Columbia, have invented certain new and useful Improvements in Felly-Joint Holders; and I do hereby declare the following to be a full, clear, and exact description thereof, reference being had to the accompanying drawings, making a part of this specification, in which—

Figure 1:
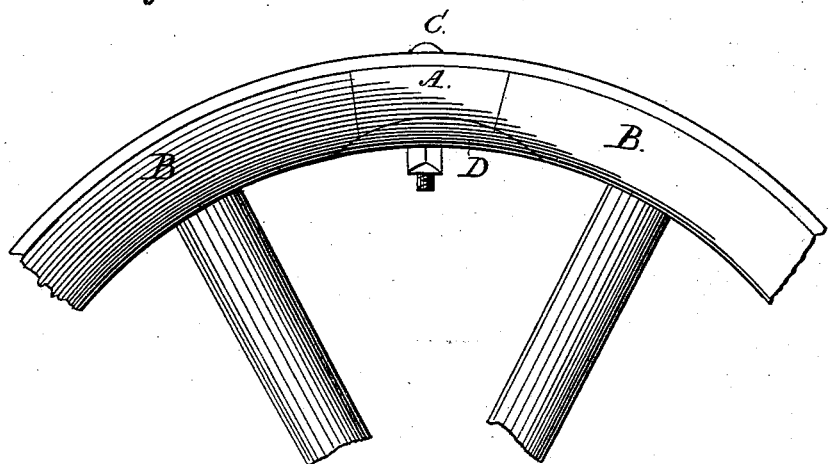
Figure 2:
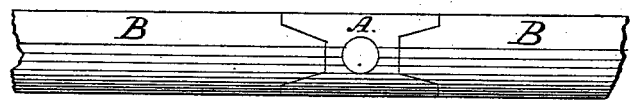
Figure 3:
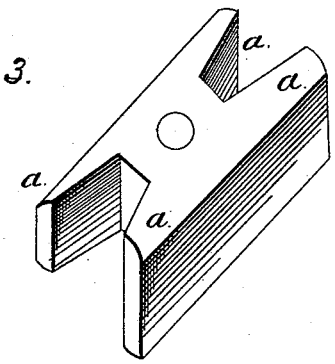

Figure 1 is a perspective view, showing my invention applied to the rim of a wheel. Fig. 2 is a view of the device, showing the plate or hood removed. Fig. 3 is a view of the lock.

My invention relates to improvements in devices for securing felly-joints; and consists of a lock of novel construction, as hereinafter described and claimed.

In order that those skilled in the art may make and use my invention, I will proceed to describe the exact manner in which I have carried it out.

In the drawings, A represents a lock, made of suitable metal, and of the same width and depth as the fellies or rim, and provided with the inclined bifurcations *a a*, between which fit the wedge-shaped ends of the fellies B B, as shown in Fig. 2. Through the center or body of the lock, between the bifurcations, is a single bolt-hole for the reception of the bolt C, which passes through tire and lock, and finally through the center of the plate or hood D, pressing said plate firmly down upon the lock and the ends of the fellies, and enabling it to hold the ends together so rigidly that they will not yield to strain upon any point.

It is apparent that the edges of the plate or hood D should project over and clasp each side of the fellies, so as to effectually hold them in position, and that it may be somewhat shorter than those with two bolts.

My device is much neater in appearance than those in use, and does not mar to such a degree the smooth appearance of the rim of the wheel.

Having thus described my invention, what I claim as new, and desire to secure by Letters Patent, is—

The lock A, provided with the bifurcations *a a*, in combination with the fellies B, plate D, and the bolt C, all constructed to operate substantially as and for the purpose set forth.

CLINTON ADAMS.

Attest:
   W. F. MORSELL,
   G. A. WIGHT.